United States Patent
Mizushima et al.

(10) Patent No.: US 9,888,704 B2
(45) Date of Patent: Feb. 13, 2018

(54) OIL OR FAT COMPOSITION AND CHOCOLATE

(71) Applicant: FUJI OIL COMPANY LIMITED, Osaka (JP)

(72) Inventors: Shigeki Mizushima, Ibaraki (JP); Hitomi Omori, Osaka (JP); Masayuki Matsui, Ibaraki (JP)

(73) Assignee: FUJI OIL HOLDINGS INC., Osaka (JP)

( * ) Notice: Subject to any disclaimer, the term of this patent is extended or adjusted under 35 U.S.C. 154(b) by 681 days.

(21) Appl. No.: 14/388,935

(22) PCT Filed: Mar. 27, 2013

(86) PCT No.: PCT/JP2013/058907
§ 371 (c)(1),
(2) Date: Sep. 29, 2014

(87) PCT Pub. No.: WO2013/146834
PCT Pub. Date: Oct. 3, 2013

(65) Prior Publication Data
US 2015/0056361 A1 Feb. 26, 2015

(30) Foreign Application Priority Data

Mar. 30, 2012 (JP) ................. 2012-078489

(51) Int. Cl.
| | | |
|---|---|---|
| A23G 1/38 | (2006.01) | |
| A23D 9/00 | (2006.01) | |
| A23D 9/02 | (2006.01) | |
| C11B 7/00 | (2006.01) | |
| C11C 3/08 | (2006.01) | |
| C11C 3/10 | (2006.01) | |

(52) U.S. Cl.
CPC ............. *A23G 1/38* (2013.01); *A23D 9/00* (2013.01); *A23D 9/02* (2013.01); *C11B 7/0075* (2013.01); *C11C 3/08* (2013.01); *C11C 3/10* (2013.01); *A23V 2002/00* (2013.01)

(58) Field of Classification Search
CPC .................................. A23G 1/38; A23D 9/00
USPC ......................................... 426/607
See application file for complete search history.

(56) References Cited

U.S. PATENT DOCUMENTS

| | | | | |
|---|---|---|---|---|
| 4,594,259 A | | 6/1986 | Baker et al. | |
| 4,910,037 A | * | 3/1990 | Sagi | A23D 7/05 426/601 |
| 5,069,915 A | * | 12/1991 | Devitt | A23D 9/00 426/417 |
| 2010/0104731 A2 | * | 4/2010 | Ueyama | A23D 9/00 426/607 |
| 2010/0255152 A1 | | 10/2010 | Arimoto et al. | |
| 2011/0262592 A1 | | 10/2011 | Kang et al. | |
| 2012/0027912 A1 | | 2/2012 | Sagi et al. | |
| 2014/0287096 A1 | * | 9/2014 | Nunez | A23G 1/56 426/45 |

FOREIGN PATENT DOCUMENTS

| | | |
|---|---|---|
| JP | 61-209545 | 9/1986 |
| JP | 61-254143 | 11/1986 |
| JP | 63-240745 | 10/1988 |
| JP | 11-169191 | 6/1999 |
| JP | 11-187814 | 7/1999 |
| JP | 2001-055598 | 2/2001 |
| JP | 2009-031679 | 2/2009 |
| WO | 2009/031680 | 3/2009 |
| WO | 2010/110260 | 9/2010 |
| WO | 2011/068275 | 6/2011 |
| WO | 2011/115063 | 9/2011 |
| WO | 2011/138034 | 11/2011 |

OTHER PUBLICATIONS

Extended European Search Report dated Oct. 21, 2015 in corresponding European Patent Application No. 13 76 7977.5.
Geoff Talbot: "Vegetable fats in Chocolate", International Food Ingredients, No. 6, Dec. 1, 2003, p. 6, XP055220123, ISSN: 0924-5863.
Opposition to Grant of Patent dated Nov. 6, 2015 in corresponding Japanese Patent No. 5713122 (partial English translation).
Tetsuo Koyano et al., "Crystallization Behavior of Ternary Mixture of POP/POS/SOS", Oil Chemistry, 1993, vol. 42, No. 6, pp. 23-27 (partial English translation).
Edible Oil-and-fat—it's use and oily food, First edition published on Apr. 5, 2000, p. 111-113 (partial English translation).
Notice of Revocation dated Jan. 27, 2016 in corresponding Japanese Patent No. 5713122 (partial English translation).
Partial English translation of Kato et al., "Use of palm oil/palm kernel oil", Saiwai Shobo, Jul. 31, 1990, pp. 167-173.
International Search Report dated Apr. 23, 2013 in International Application No. PCT/JP2013/058907.
Koeber et al., "The Certification of the Content of Five Triglycerides in Cacaobutter", IRMM-801, European Commission, IRMM information Reference Materials, 2003, pp. 1-37.
Lipp et al., "Review of cocoa butter and alternative fats for use in chocolate—Part A. Compositional data", Food Chemistry, vol. 62, No. 1, 1998, pp. 73-97.

(Continued)

*Primary Examiner* — Jeffrey P Mornhinweg
(74) *Attorney, Agent, or Firm* — Wenderoth, Lind & Ponack, L.L.P.

(57) ABSTRACT

A chocolate having good solidification properties, a high mold releasability and a high crystal stabilization rate, said chocolate being obtained by using an oil or fat composition wherein StOSt and POP triglycerides are contained each in a definite amount or more and StLSt, PLP, StStO and PPO triglycerides are contained each in a definite amount or less. As a result, the productivity of the chocolate can be increased.

17 Claims, No Drawings

(56) References Cited

OTHER PUBLICATIONS

"Chocolate Melting and Tampering", The Manufacturing Confectioner, J. Food Sci., 62(4)1, 1997, pp. 85-88.
Kato et al., "Use of palm oil and palm kernel oil", Saiwai Shobo, 1990, pp. 166-173.

* cited by examiner

OIL OR FAT COMPOSITION AND CHOCOLATE

TECHNICAL FIELD

The present invention relates to an oil-and-fat composition and a tempered chocolate obtained by using the oil-and-fat composition. More specifically, the present invention relates to an oil-and-fat composition having specific triglyceride composition for improving solidification property, demolding property, crystal stabilization speed, and productivity, and a chocolate obtained by using the oil-and-fat composition.

BACKGROUND ART

In recent years, chocolate manufacturing company is forced to not only develop a new product, but also attempt to reduce production costs by improving the productivity due to an intensification of intercompany competition from globalization, etc.

When industrially manufacturing large amount of chocolate, molten chocolate liquor is poured into a mold, and then chocolate is demolded after cooling and solidification. Subsequently, hardness of chocolate is increased by stabilizing fat crystal included in chocolate through aging period of about 5 to 7 days at about 20° C., and than it is distributed. An increase in solidification speed, demolding speed and crystal stabilization speed leads to reduce the time required between the production and distribution and can contribute to cost reduction by improving productivity of the chocolate manufacturer. Especially, reducing the aging period which requires long periods of time in the chocolate production is earnest desire for the chocolate manufacturer because it can greatly contribute directly to an improvement of productivity. Meanwhile, competitiveness is deteriorated if chocolate quality is deteriorated by improving the productivity thereof. It is like putting the cart before the horse. That is, it is necessary to maintain a hardness of breaking comfortably (snappiness) and a meltability in the mouth which meets melting in the mouth with expressing a taste at appropriate speed within an acceptable range. When a molten chocolate liquor is directly cooled and solidified, stable hardness cannot be obtained, for example, it is not solidified immediately or it cannot be demolded. Therefore, tempering process is generally essential before the solidification in order to improve solidification speed and demolding speed from mold. The tempering process is carried out for the purpose of making a small amount stable (V-type) crystal in oil-and-fat. As the tempering process, a process including melting oil-and-fat in the chocolate at 45 to 50° C., cooling to 28 to 29° C., and then raising the temperature to 30 to 32° C. by using a tempering apparatus (non-Patent Document 1) or a process including adding triglyceride having a crystal similar to stable crystal of cocoa butter having specific fatty acid composition to a chocolate liquor as shown in Patent Document 1 is generally known.

The case of generating appropriate amount of stabilized crystal in oil-and-fat is called as well-tempered and the case of generating large amount of stabilized crystal is called as over-tempered. In the case of over-tempered, solidification speed, demolding speed and crystal stabilization speed are faster than the case of well-tempered, however, workability of filling to mold and coating process becomes low due to an rapidly increase of viscosity. Meanwhile, in the case of well-tempered, workability is good, but solidification speed, demolding speed and crystal stabilization speed are slightly slow. Therefore, the following attempt for reforming an oil-and-fat composition and physical property of an oil-and-fat composition for chocolate has been made in order to further improve productivity.

As an attempt for improving an oil-and-fat composition, a method for obtaining good happiness, meltability in the mouth and workability by using a fractionated sal fat as a cacao butter alternative including 0.4 wt % or less of triglyceride containing dihydroxy stearic acid (DHS-TG) and 85 wt % or more of 1,3-disaturated-2-unsaturated triglyceride (SUS) to chocolate is disclosed (Patent Document 2). However, triglyceride components such as StOA and AOA which are included in sal fat at large content decrease snapiness by inhibiting crystallization or packing of POP, POSt and StOSt components which are major component of cacao butter and may deteriorate meltability in the mouth because components such as AOA has relatively higher melting point compared to cacao butter. Therefore, further improvement has been required. (Where, St represents stearic acid, P represents palmitic acid, A represents arachidic acid and O represents oleic acid, respectively.)

In addition, an attempt for improving a tempering property and demolding speed by improving crystal stabilization speed by adding an oil-soluble material which is liquid state at 25° C. to hard butter having low iodine value and large amount of 2-unsaturated-1,3-disaturated triglyceride components is disclosed (Patent Document 3). However, problems such as softening of feeling after bite and deterioration of snappiness may be occurred. Therefore, further improvement has been required.

PRIOR ART DOCUMENTS

Patent Documents

Patent Document 1: JP S63-240745 A
Patent Document 2: JP 2001-55598 A
Patent Document 3: JP S61-254143 A Non-Patent Documents Non-Patent Document 1: The Manufacturing Confectioner, 9, p. 85-88, 1997, J. Food Sci., 62(4) 1, 1997

SUMMARY OF THE INVENTION

Problems to be Solved by the Invention

An object of the present invention is to provide an oil-and-fat composition which can be used as a cacao butter alternative and can improve solidification property, demolding property and crystal stabilization speed, and thereby improving productivity while maintaining the snappiness when used in chocolate, and to provide a chocolate including the oil-and-fat composition.

Means for Solving the Problems

The present inventors have intensively studied. As a result, they have found that the above-mentioned object is achieved by the following oil-and-fat composition and chocolate including the oil-and-fat composition.

That is, the first aspect of the present invention is an oil-and-fat composition, where SOS triglyceride content in the oil-and-fat composition is 80 wt % or more, StOSt content in the oil-and-fat composition is 25 wt % or more, POP content in the oil-and-fat composition is 10 wt % or more, a ratio of StLSt/StOSt in the oil-and-fat composition is 0.08 or less and a ratio of StStO/StOSt in the oil-and-fat composition is 0.03 or less, and where S represents saturated fatty acid having C16 to C22, St represents stearic acid, P represents palmitic acid, L represents linoleic acid and O represents oleic acid, and SOS represents a triglyceride in which fatty acids at 1,3-positions are S and fatty acid at 2-position is O, StOSt represents a triglyceride in which fatty acids at 1,3-positions are St and fatty acid at 2-position is O, StLSt represents a triglyceride in which fatty acids at 1,3-positions are St and fatty acid at 2-position is L, StStO represents a triglyceride in which fatty acids at 1,2-positions or 2,3-positions are St and fatty acid at 3-position or 1-position is O, and POP represents a triglyceride in which fatty acids at 1,3-positions are P and fatty acid at 2-position is O.

The second aspect of the present invention is the oil-and-fat composition of the first aspect, where a ratio of PLP/POP in the oil-and-fat composition is 0.15 or less and a ratio of PPO/POP in the oil-and-fat composition is 0.10 or less, and where PPO represents a triglyceride in which fatty acids at 1,2-positions or 2,3-positions are P and fatty acid at 3-position or 1-position is O and PLP represents a triglyceride in which fatty acids at 1,3-positions are P and fatty acid at 2-position is L.

The third aspect of the present invention is the oil-and-fat composition of the first aspect or the second aspect, including:

30 to 80 wt % of an oil-and-fat (A) including 70 wt % or more of StOSt and arachidic acid at a content of not more than 5 wt % relative to constituent fatty acid in the oil-and-fat (A); and 20 to 70 wt % of an oil-and-fat (B) including 60 wt % or more of POP.

The fourth aspect of the present invention is the oil-and-fat composition of the third aspect, where the oil-and-fat (A) is an oil-and-fat of high melting point fraction or mid fraction which is obtained by fractionating an interesterified oil by solvent fractionation or dry fractionation, where the interesterified oil is obtained by subjecting high-oleic plant oil comprising oleic acid at 80 wt % or more relative to constituent fatty acid in the high-oleic plant oil, and stearic acid or stearic acid alcohol ester to interesterification with 1,3-position-specific lipase.

The fifth aspect of the present invention is the oil-and-fat composition of the third aspect or the fourth aspect, where the oil-and-fat (B) is an oil-and-fat of high melting point fraction or mid fraction which is obtained by fractionating a palm oil by solvent fractionation or dry fractionation.

The sixth aspect of the present invention is a tempered chocolate including the oil-and-fat composition any one of the first to fifth aspects.

The seventh aspect of the present invention is a tempering type cacao butter alternative, including the oil-and-fat composition any one of the first to fifth aspects.

The eighth aspect of the present invention is a process for reducing aging time, including using the chocolate of the sixth aspect.

Effect of the Invention

In order to obtain desired snappiness and heat resistance and shape retention property, amount of StLSt, PLP, StStO and PPO triglyceride is adjusted in an oil-and-fat composition including specific amount or more of SOS, StOSt and POP triglyceride. This allows for a production of an oil-and-fat composition which can improve solidification property, demolding property and crystal stabilization speed and improve productivity while maintaining the snappiness and a production of chocolate including the oil-and-fat composition.

MODE FOR CARRYING OUT THE INVENTION (Measurement Method of Triglyceride Composition)

A content of each triglyceride in an oil-and-fat composition can be determined as a total of symmetric and asymmetric triglycerides (e.g. a total of StStO content and StOSt content) with the following high performance liquid chromatography (1). In addition, composition of symmetric triglyceride or asymmetric triglyceride can be measured as (StStO/(StStO+StOSt)) with thin layer chromatography (2). And each of StStO and StOSt contents can be determined by multiplying this result by the result from the (1).

(1) The high performance liquid chromatography was carried out with (column: ODS, eluent: acetone/acetonitrile=80/20, elution rate: 0.9 ml/minute, column temperature: 25° C., detector: differential refraction type).

(2) The thin layer chromatography was carried out with (plate: a silver nitrate thin layer plate, development solvent: benzene/hexane/diethyl ether=75/25/2, detector: a densitometer).

An oil-and-fat composition of the present invention must include 80 wt % or more, preferably 85 wt % or more, more preferably 90 wt % or more of SOS triglyceride. When an oil-and-fat composition including less than 80 wt % of SOS triglyceride is used for chocolate, it is not preferable because demolding property and snappiness of chocolate are deteriorated.

An oil-and-fat composition of the present invention must include 25 wt % or more, preferably 30 wt % or more, more preferably 35 wt % or more of StOSt. When an oil-and-fat composition including less than 25 wt % of StOSt triglyceride is used for chocolate, it is not preferable because heat resistance of the chocolate is reduced. In addition, it is preferable that the StOSt content is not more than 60 wt %. When the StOSt content is more than 60 wt %, it is not preferable because heat resistance of the chocolate is too high beyond necessity and meltability in the mouth is deteriorated.

An oil-and-fat composition of the present invention must include 10 wt % or more, preferably 20 wt % or more, more preferably 30 wt % or more of POP. When a POP content is less than 10 wt %, StOSt content is relatively higher. As a result, too much heat resistance and deterioration of meltability in the mouth are caused. Therefore, it is not preferable.

An oil-and-fat composition of the present invention must have 0.08 or less, preferably 0.06 or less, more preferably 0.03 or less of a ratio of StLSt/StOSt. When the ratio of StLSt/StOSt is more than 0.08, unstable crystallization of SOS proceeds due to StLSt and gap between fat crystals becomes large, and thereby demolding property is deteriorated and long time is required for aging due to a decrease in crystal stabilization speed. Therefore, it is not preferable.

An oil-and-fat composition of the present invention must have 0.03 or less, preferably 0.02 or less, more preferably 0.015 or less of a ratio of StStO/StOSt. When the ratio of StStO/StOSt is more than 0.03, unstable crystallization of SOS proceeds due to StStO and gap between fat crystals becomes large, and thereby demolding property is deteriorated and long time is required for aging due to a decrease in crystal stabilization speed. Therefore, it is not preferable.

An oil-and-fat composition of the present invention preferably has 0.15 or less, more preferably 0.08 or less of a ratio of PLP/POP. When the ratio of PLP/POP is more than 0.15, unstable crystallization of POP proceeds due to PLP and gap between fat crystals becomes large, and thereby demolding property is deteriorated and long time is required for aging due to a decrease in crystal stabilization speed. Therefore, it is not preferable.

An oil-and-fat composition of the present invention preferably has 0.10 or less, more preferably 0.075 or less, most preferably 0.015 or less of a ratio of PPO/POP. When the ratio of PPO/POP is more than 0.10, unstable crystallization of POP proceeds due to PPO and gap between fat crystals becomes large, and thereby demolding property is deteriorated and long time is required for aging due to a decrease in crystal stabilization speed. Therefore, it is not preferable.

An oil-and-fat composition of the present invention preferably includes 3 wt % or less, more preferably 2 wt % or less, most preferably 1 wt % or less of SSS (a triglyceride in which all constituent fatty acids are S). When the SSS content is more than 3 wt %, texture of the chocolate tends to waxy.

An oil-and-fat composition of the present invention preferably includes an oil-and-fat (A) including 70 wt % or more of StOSt and arachidic acid at a content of not more than 5 wt % relative to constituent fatty acid in the oil-and-fat (A) and an oil-and-fat (B) including 60 wt % or more of POP, as a part of the raw material. Preferably, an additive amount of the oil-and-fat (A) is 30 to 80 wt % and an additive amount of the oil-and-fat (B) is 20 to 70 wt %. More preferably, an additive amount of the oil-and-fat (A) is 40 to 70 wt % and an additive amount of the oil-and-fat (B) is 30 to 60 wt %. When the additive amount of the oil-and-fat (A) is more than 80 wt %, too much heat resistance and deterioration of meltability in the mouth are caused in the chocolate obtained by adding the oil-and-fat composition of the present invention. Therefore, it is not preferable. When the additive amount of the oil-and-fat (A) is less than 30 wt %, heat resistance and shape retention property of the obtained chocolate is markedly-decreased and the commercial value as a cocoa butter alternative is lost.

An arachidic acid content in the oil-and-fat (A) to be added to an oil-and-fat composition of the present invention is preferably 5 wt % or less, more preferably 1 wt % or less. When the arachidic acid content is more than 5 wt %, it is not preferable because increased StOA or AOA component become a factor of inhibiting a crystallization of StOSt which is major component of the crystal due to a difference of the fatty acid chain length.

As the oil-and-fat (A) which is preferably added to an oil-and-fat composition of the present invention includes, for example, an oil-and-fat including high melting point fraction or mid fraction which is obtained by fractionating an interesterified oil by solvent fractionation or dry fractionation, where the interesterified oil is obtained by subjecting high-oleic plant oil and stearic acid or stearic acid alcohol ester to interesterification with 1,3-position-specific lipase. The high-oleic plant oil includes, for example, sunflower oil, rapeseed oil, safflower oil, soybean oil etc. having 80 wt % or more, preferably 85 wt % or more, more preferably 90 wt % or more of oleic acid content. When subjecting a plant oil including less than 80 wt % of oleic acid and stearic acid or stearic acid alcohol ester to interesterification with 1,3-position-specific lipase, it is not preferable because a ratio of StLSt/StOSt in the obtained interesterified oil is high, and thereby the oil-and-fat composition of the present invention cannot be effectively obtained.

In addition, other examples of the oil-and-fat (A) includes, for example, plant oil-and-fat such as allanblackia fat, shea butter and sal fat, an oil-and-fat including high melting point fraction or mid fraction which is obtained by fractionating the plant oil-and-fat by solvent fractionation or dry fractionation. As an oil-and-fat in which arachidic acid content in the constituent fatty acid is low, oil interesterified with lipase of which raw materials are high-oleic plant oil, and stearic acid or stearic acid alcohol ester, and fractionated oil thereof; or allanblackia fat, and fractionated oil thereof are preferable.

The oil-and-fat (B) to be added to an oil-and-fat composition of the present invention includes, for example, an oil-and-fat including high melting point fraction or mid fraction which is obtained by fractionating an interesterified oil by solvent fractionation or dry fractionation, where the interesterified oil is obtained by subjecting high-oleic plant oil and palmitic acid or palmitic acid alcohol ester to interesterification with 1,3-position-specific lipase. The high-oleic plant oil includes, for example, sunflower oil, rapeseed oil, safflower oil, soybean oil etc. having 80 wt % or more, preferably 85 wt % or more, more preferably 90 wt % or more of oleic acid content. When subjecting a plant oil including less than 80 wt % of oleic acid and palmitic acid or palmitic acid alcohol ester to interesterification with 1,3-position-specific lipase, it is not preferable because a ratio of PLP/POP in the obtained interesterified oil is high, and thereby the oil-and-fat composition of the present invention cannot be effectively obtained.

In addition, other examples of the oil-and-fat (B) includes, for example, plant oil-and-fat such as palm oil, or high melting point fraction or mid fraction which is obtained by fractionating them by solvent fractionation or dry fractionation.

Lipase which can be used in the present invention includes 1,3-position-specific lipase, and especially, one or two or more of 1,3-position-specific lipases obtained from the group consisting of genus *Rhizopus*, genus *Mucor*, genus *Aspergillus*, genus *Alcaligenes* and genus *Humicola* are preferable. When other lipase which does not have 1,3-position-specificity, for example lipase derived from genus *Candida*, is used, it is not preferable because the obtained interesterified oil has high StStSt content and low StOSt content, and thereby the oil-and-fat composition of the present invention cannot be effectively obtained.

In addition, these lipases are preferably used with immobilizing to immobilized carrier such as diatom earth, silica, ceramic, activated carbon and ion exchange resin.

The interesterification reaction can be carried out with either batch-wise or continuous process such as packed bed reactor, and the continuous process is preferable because it is effective.

In addition, interesterification reaction can be carried out in an organic solvent such as petroleum ether and n-hexane, but an organic solvent-free condition is preferable because process of removing organic solvent after the reaction is not necessary.

An oil-and-fat composition of the present invention can include an oil-and-fat other than the oil-and-fat (A) and oil-and-fat (B), as long as the other oil-and-fat does not inhibit the effect of the invention. An additive amount of the oil-and-fat other than the oil-and-fat (A) and oil-and-fat (B) is less than 30 wt %, preferably less than 20 wt %, more preferably less than 10 wt %, most preferably less than 5 wt % relative to total weight of the oil-and-fat composition.

A tempering type cacao butter alternative of the present invention includes 80 wt % or more, preferably 100 wt % of an oil-and-fat composition of the present invention. In addition, an optional component which is generally used for preparing confectionery, such as color, emulsifier, antioxidant and flavor, can be added. The additive amount thereof is 10 wt % or less, preferably 5 wt % or less, most preferably 2 wt % or less to the cacao butter alternative of the present invention.

The emulsifier includes glycerol fatty acid ester, sucrose fatty acid ester, sorbitan fatty acid ester, glycerol organic acid fatty acid ester, polyglycerin fatty acid ester, propylene glycol fatty acid ester, lecithin and the like.

An oil-and-fat composition of the present invention can be used for chocolate. In this case, the additive amount of the oil-and-fat composition is preferably 5 to 50 parts by weight, more preferably 5 to 25 parts by weight, most preferably 5 to 15 parts by weight relative to 100 parts by weight of total ingredients in the chocolate.

A tempered chocolate of the present invention includes dark chocolate made from ingredients including cacao mass, cocoa powder, saccharide such as sugar, oil-and-fat such as cocoa butter, emulsifier and flavor; milk chocolate made from ingredients including cacao mass, cocoa powder, saccharide such as sugar, oil-and-fat such as cocoa butter, milk product such as powdered whole milk, emulsifier and flavor; white chocolate made from ingredients including saccharide such as sugar, oil-and-fat such as cocoa butter, milk product such as powdered whole milk, emulsifier and flavor; and color chocolate obtained by coloring and flavoring the white chocolate with color and flavor.

Chocolate is also classified into chocolate (cacao content: 35% or more), quasi chocolate (cacao content: 15% or more), milk chocolate (cacao content: 21% or more), quasi milk chocolate (cacao content: 7% or more), chocolate coating as a chocolate food (cacao content: 8% or more) and chocolate coating including dairy product (cacao content: 5% or more) depending on a cacao content, and white coating and color coating without containing cacao content. The chocolate of the present invention includes all of the above chocolates.

Then, a chocolate obtained by adding an oil-and-fat composition of the present invention has excellent solidification property, demolding property and crystal stabilization speed, and productivity. And productivity of the chocolate is improved because aging period can be shortened to 3 days or less which is less than half that in the conventional way.

EXAMPLES

The Examples will be described in the following, but the present invention is not limited by the following Examples. In Examples, part and % mean a weight basis, unless otherwise specified.

Experimental Example 1

Preparation of StOSt-Containing Oil-and-Fat

Thirty parts by weight of high-oleic sunflower oil having 86% of oleic acid content relative to the constituent fatty acid and 70 parts by weight of ethyl stearate were mixed and the mixture was subjected to interesterification with using 1,3-position specific lipase to obtain a reaction oil. The reaction oil was distilled to remove ethyl ester. The obtained oil was subjected to solvent fractionation with acetone to obtain high melting point fractions in various yields. Each of the high melting point fractions were purified by conventional methods to obtain StOSt-containing fats A to D.

In addition, allanblackia fat was subjected to solvent fractionation with acetone, and the obtained oil-and-fat composition as the high melting point fraction was purified by conventional methods to obtain StOSt-containing fat E.

Further, degummed shea butter was subjected to solvent fractionation with acetone, and the obtained oil-and-fat composition as the high melting point fraction was purified by conventional methods to obtain StOSt-containing fat F.

Furthermore, sal fat was subjected to solvent fractionation with acetone, and the obtained oil-and-fat composition as the high melting point fraction was purified by conventional methods to obtain StOSt-containing fat G.

Fractionation yield, triglyceride composition, and arachidic acid content in the constituent fatty acid of each StOSt-containing fat are shown in the following.

StOSt-containing fat A (fractionation yield=14%, SOS=93.1%, StOSt=83.6%, StLSt=1.3%, StStO=0.4%, StOO=0.6%, arachidic acid content=1.3%)

StOSt-containing fat B (fractionation yield=27%, SOS=90.2%, StOSt=79.4%, StLSt=2.6%, StStO=0.6%, StOO=1.6%, arachidic acid content=1.0%)

StOSt-containing fat C (fractionation yield=40%, SOS=87.8%, StOSt=74.2%, StLSt=4.2%, StStO=0.8%, StOO=3.0%, arachidic acid content=0.6%)

StOSt-containing fat D (fractionation yield=51%, SOS=80.2%, StOSt=65.4%, StLSt=6.1%, StStO=1.0%, StOO=7.1%, arachidic acid content=0.5%)

StOSt-containing fat E (fractionation yield=73%, SOS=79.8%, StOSt=77.1%, StLSt=0.1%, StStO=0.8%, StOO=5.0%, arachidic acid content=0.1%)

StOSt-containing fat F (fractionation yield=45%, SOS=86.2%, StOSt=76.1%, StLSt=4.3%, StStO=1.1%, StOO=2.9%, arachidic acid content=1.8%)

StOSt-containing fat G (fractionation yield=48%, SOS=90.5%, StOSt=60.1%, StLSt=0.9%, StStO=0.6%, StOO=1.9%, arachidic acid content=8.6%)

Experimental Example 2

Preparation of StStO-Containing Fat

High-oleic sunflower oil having 86% of oleic acid content relative to the constituent fatty acid and fully hydrogenated rapeseed oil were mixed and the mixture was subjected to random interesterification with using sodium methylate to obtain a reaction oil. The reaction oil was subjected to solvent fractionation with acetone to remove high melting point fraction and low melting point fraction, and to obtain mid fraction at a yield of 29%. The obtained mid fraction was purified by conventional methods to obtain StStO fat (StOSt=22.4%, StLSt=2.5%, StStO=57.6%, StOO=1.6%, arachidic acid content=0.5%).

Preparation of Oil-and-Fat (A)

Each StOSt-containing fat obtained in Experimental Example 1 and StStO-containing fat obtained in Experimental Example 2 were mixed to prepare various oils-and-fats (A) as shown in the following formulations:

Oil-and-fat (A)-1: StOSt-containing fat A alone,
Oil-and-fat (A)-2: StOSt-containing fat B alone,
Oil-and-fat (A)-3: StOSt-containing fat C alone,
Oil-and-fat (A)-4: StOSt-containing fat D alone,
Oil-and-fat (A)-5: StOSt-containing fat E alone,
Oil-and-fat (A)-6: StOSt-containing fat F alone,
Oil-and-fat (A)-7: StOSt-containing fat G alone,
Oil-and-fat (A)-8: Mixture of 51 parts by weight of StOSt-containing fat C and 1 part by weight of StStO-containing fat, and Oil-and-fat (A)-9: Mixture of 50 parts by weight of StOSt-containing fat C and 2 parts by weight of StStO-containing fat.

All oils-and-fats (A) except for the oil-and-fat (A)-7 had 70 wt % or more of StOSt content and less than 5 wt % of arachidic acid content.

Experimental Example 3

Preparation of POP-Containing Oil-and-Fat

Thirty parts by weight of high-oleic sunflower oil having 86% of oleic acid content relative to the constituent fatty acid and 70 parts by weight of ethyl palmitate were mixed and the mixture was subjected to interesterification with using 1,3-position specific lipase to obtain a reaction oil. The reaction oil was distilled to remove ethyl ester. The obtained oil was subjected to solvent fractionation with acetone to obtain high melting point fractions in various yields. Each of the high melting point fractions were purified by conventional methods to obtain POP-containing fat A.

In addition, palm mid fraction (PALMEL 26; manufactured by Fuji Oil Co., Ltd.) was subjected to solvent fractionation with acetone to obtain high melting point fractions in various yields. Each of the high melting point fractions were purified by conventional methods to obtain POP-containing fats B and C.

POP-containing fat A (fractionation yield=46.2%, SOS=91.8%, POP=88.4%, PLP=2.3%, PPO=0.5%)
POP-containing fat B (fractionation yield=55.8%, SOS=88.6%, POP=67.6%, PLP=4.4%, PPO=3.6%)
POP-containing fat C (fractionation yield=70.2%, SOS=82.2%, POP=61.0%, PLP=6.1%, PPO=5.2%)
Palm mid fraction PALMEL 26 (SOS=54.3%, POP=44.2%, PLP=9.8%, PPO=5.4%)

Experimental Example 4

Preparation of PPO-Containing Oil-and-Fat

Thirty parts by weight of high-oleic sunflower oil having 86% of oleic acid content relative to the constituent fatty acid and 70 parts by weight of ethyl palmitate were mixed and the mixture was subjected to interesterification with using 1,3-position specific lipase to obtain a reaction oil. The reaction oil was distilled to remove ethyl ester and subjected to random interesterification with using sodium methylate to obtain reaction oil. The obtained reaction oil was subjected to solvent fractionation with acetone to remove high melting point fraction and low melting point fraction, and to obtain mid fraction at a yield of 23%. The obtained mid fraction was purified by conventional methods to obtain PPO-containing fat (POP=25.3%, PLP=2.4%, PPO=61.9%).

Preparation of Oil-and-Fat (B)

Palm mid fraction (PALMEL 26; manufactured by Fuji Oil Co., Ltd.), and each POP-containing fat obtained in Experimental Example 3 and PPO-containing oil-and-fat obtained in Experimental Example 4 were mixed to prepare various oils-and-fats (B) as shown in the following formulations:

Oil-and-fat (B)-1: POP-containing fat A alone,
Oil-and-fat (B)-2: POP-containing fat B alone,
Oil-and-fat (B)-3: POP-containing fat C alone,
Oil-and-fat (B)-4: Palm mid fraction alone,
Oil-and-fat (B)-5: Mixture of 50 parts by weight of POP-containing fat B and 2 parts by weight of PPO-containing fat, and
Oil-and-fat (B)-6: Mixture of 48 parts by weight of POP-containing fat B and 6 parts by weight of PPO-containing fat.

All oils-and-fats (B) except for the oil-and-fat (B)-4 had 60 wt % or more of POP content.

Examples 1 to 14, Comparative Examples 1 to 5

Each oil-and-fat (A) and each oil-and-fat (B) were mixed according to the formulations as shown in table 1 (unit: parts by weight) to obtain oil-and-fat compositions of Examples 1 to 14 and Comparative Examples 1 to 5. In addition, high-oleic sunflower oil ("High-Ol 75B": manufactured by Fuji Oil Co., Ltd.) was used as a part of raw material oil-and-fat other than the oil-and-fat (A) and the oil-and-fat (B) in Example 7. The high-oleic sunflower oil was liquid oil of which crystal was not observed in 20° C. Triglyceride composition was measured in Examples 1 to 14 and Comparative Example 1 to 5. Each triglyceride composition and ratio was shown in table 2.

TABLE 1

| | | | | Formulation of each oil-and-fat composition | | |
|---|---|---|---|---|---|---|
| | Oil-and-fat (A) | Additive amount of oil-and-fat (A) (parts by weight) | Oil-and-fat (B) | Additive amount of oil-and-fat (B) (parts by weight) | Other oil-and-fat | Additive amount of other oil-and-fat (parts by weight) |
| Example 1 | Oil-and-fat (A)-1 | 45.3 | Oil-and-fat (B)-2 | 54.7 | — | 0.0 |
| Example 2 | Oil-and-fat (A)-2 | 47.5 | Oil-and-fat (B)-2 | 52.5 | — | 0.0 |
| Example 3 | Oil-and-fat (A)-3 | 50.0 | Oil-and-fat (B)-2 | 50.0 | — | 0.0 |
| comparative Example 1 | Oil-and-fat (A)-4 | 57.6 | Oil-and-fat (B)-2 | 42.4 | — | 0.0 |
| Example 4 | Oil-and-fat (A)-5 | 50.0 | Oil-and-fat (B)-2 | 50.0 | — | 0.0 |
| Example 5 | Oil-and-fat (A)-6 | 50.0 | Oil-and-fat (B)-2 | 50.0 | — | 0.0 |
| Example 6 | Oil-and-fat (A)-7 | 50.0 | Oil-and-fat (B)-2 | 50.0 | — | 0.0 |

TABLE 1-continued

Formulation of each oil-and-fat composition

|  | Oil-and-fat (A) | Additive amount of oil-and-fat (A) (parts by weight) | Oil-and-fat (B) | Additive amount of oil-and-fat (B) (parts by weight) | Other oil-and-fat | Additive amount of other oil-and-fat (parts by weight) |
| --- | --- | --- | --- | --- | --- | --- |
| Example 7 | Oil-and-fat (A)-1 | 45.3 | Oil-and-fat (B)-2 | 50.0 | High oleic sunflower oil | 4.7 |
| Example 8 | Oil-and-fat (A)-3 | 75.0 | Oil-and-fat (B)-2 | 25.0 | — | 0.0 |
| Example 9 | Oil-and-fat (A)-3 | 35.0 | Oil-and-fat (B)-2 | 65.0 | — | 0.0 |
| Comparative Example 2 | Oil-and-fat (A)-3 | 25.0 | Oil-and-fat (B)-2 | 75.0 | — | 0.0 |
| Example 10 | Oil-and-fat (A)-3 | 50.0 | Oil-and-fat (B)-1 | 50.0 | — | 0.0 |
| Example 11 | Oil-and-fat (A)-3 | 50.0 | Oil-and-fat (B)-3 | 50.0 | — | 0.0 |
| Comparative Example 3 | Oil-and-fat (A)-3 | 50.0 | Oil-and-fat (B)-4 | 50.0 | — | 0.0 |
| Example 12 | Oil-and-fat (A)-8 | 52.0 | Oil-and-fat (B)-2 | 49.0 | — | 0.0 |
| Comparative Example 4 | Oil-and-fat (A)-9 | 52.0 | Oil-and-fat (B)-2 | 48.0 | — | 0.0 |
| Example 13 | Oil-and-fat (A)-3 | 48.0 | Oil-and-fat (B)-5 | 52.0 | — | 0.0 |
| Example 14 | Oil-and-fat (A)-3 | 46.0 | Oil-and-fat (B)-6 | 54.0 | — | 0.0 |
| Comparative Example 5 | Oil-and-fat (A)-3 | 90.0 | Oil-and-fat (B)-2 | 10.0 | — | 0.0 |

TABLE 2

Each triglyceride composition and ratio

|  | SOS content (%) | StOSt content (%) | POP content (%) | Ratio of StLSt/StOSt | Ratio of PLP/POP | Ratio of StStO/StOSt | Ratio of PPO/POP | SSS content (%) |
| --- | --- | --- | --- | --- | --- | --- | --- | --- |
| Example 1 | 90.6 | 38.9 | 37.0 | 0.018 | 0.065 | 0.006 | 0.053 | 1.6 |
| Example 2 | 89.4 | 38.8 | 35.5 | 0.035 | 0.065 | 0.008 | 0.053 | 1.6 |
| Example 3 | 88.2 | 38.6 | 33.9 | 0.057 | 0.065 | 0.011 | 0.053 | 1.7 |
| Comparative Example 1 | 83.7 | 38.5 | 28.9 | 0.093 | 0.066 | 0.016 | 0.052 | 1.7 |
| Example 4 | 84.2 | 39.1 | 34.0 | 0.004 | 0.065 | 0.011 | 0.052 | 1.7 |
| Example 5 | 87.4 | 38.5 | 34.1 | 0.058 | 0.066 | 0.015 | 0.052 | 1.7 |
| Example 6 | 89.5 | 30.7 | 33.8 | 0.018 | 0.065 | 0.011 | 0.053 | 1.7 |
| Example 7 | 86.5 | 38.8 | 33.8 | 0.018 | 0.065 | 0.006 | 0.053 | 1.6 |
| Example 8 | 88.0 | 56.9 | 17.1 | 0.056 | 0.064 | 0.010 | 0.052 | 1.8 |
| Example 9 | 88.3 | 27.6 | 44.0 | 0.058 | 0.065 | 0.012 | 0.053 | 1.6 |
| Comparative Example 2 | 88.4 | 20.3 | 50.8 | 0.059 | 0.065 | 0.013 | 0.053 | 1.5 |
| Example 10 | 89.8 | 37.8 | 44.3 | 0.056 | 0.026 | 0.010 | 0.006 | 1.7 |
| Example 11 | 85.0 | 38.4 | 30.6 | 0.059 | 0.100 | 0.012 | 0.086 | 1.7 |
| Comparative Example 3 | 71.1 | 38.2 | 19.5 | 0.058 | 0.252 | 0.012 | 0.140 | 1.5 |
| Example 12 | 88.2 | 39.5 | 32.6 | 0.057 | 0.065 | 0.026 | 0.053 | 1.6 |
| Comparative Example 4 | 88.2 | 39.0 | 32.6 | 0.058 | 0.065 | 0.041 | 0.053 | 1.6 |
| Example 13 | 88.2 | 37.1 | 34.4 | 0.057 | 0.065 | 0.011 | 0.088 | 1.6 |
| Example 14 | 88.3 | 35.6 | 34.1 | 0.057 | 0.066 | 0.011 | 0.159 | 1.7 |
| Comparative Example 5 | 87.9 | 67.9 | 6.9 | 0.056 | 0.063 | 0.010 | 0.052 | 1.9 |

Examination Example 1

Solid fat content was measured by using the oil-and-fat compositions obtained in Examples 1 to 14 and Comparative Examples 1 to 5 under the following condition, and it was evaluated as solidification speed. Solid fat content: was measured in accordance with the solid fat content NMR method of the JOCS Standard Methods for the Analysis of Fats and Oils, provisional method 1-1996. However, sample was molten at 80° C. for 30 minutes, and then, solid fat content was measured immediately after solidifying the sample at 20° C. for 60 minutes.

Examination Example 2

Chocolate was prepared by conventional method and using the oil-and-fat compositions obtained in Examples 1 to 14 and Comparative Examples 1 to 5 according to the formulation of table 3.

TABLE 3

Formulation of chocolate

| Ingredient | Additive amount (parts by weight) |
|---|---|
| Cacao mass | 23.7 |
| Whole fat milk powder | 13.0 |
| Sugar | 46.3 |
| Cocoa butter | 7.0 |
| Oil-and-fat composition | 10.0 |
| Lecithin | 0.3 |
| Flavor | 0.02 |

Evaluation of Demolding Property of Chocolate

The chocolate produced according to the formulation of Example 3 was molten, and then subjected to tempering process to obtain chocolate mass. Then, 12 g of the chocolate mass was poured into a mold and solidified at 10° C. for 15 minutes. Demolding ratio was a ratio of chocolates which were able to remove from the mold to the solidified chocolates. In the condition, 80% or more is evaluated as good demolding property. The result was shown in table 4.

Evaluation of Crystal Stabilization Speed of Chocolate

The chocolate produced according to the formulation of Example 3 was molten, and then subjected to tempering process to obtain chocolate mass. Then, 12 g of the chocolate mass was poured into mold and solidified at 5° C. for 30 minutes. The obtained chocolate was stored at 20° C. and the hardness was measured with a rheometer every day. The measuring condition of the rheometer was, table speed of 5 cm/sec with using cylindrical plunger of 3 mm in diameter under 20° C. In addition, hardness of chocolate after 30 days storage at 20° C. was also measured as an endpoint of aging. Then, the number of days to reach 95% of hardness relative to that in the endpoint was defined as termination date of aging and the number of days required for aging was evaluated as a crystal stabilization speed. In the condition, 3 days or less is evaluated as good. The result was shown in table 4.

Evaluation of Heat Resistance and Shape Retention Property of the Chocolate

The chocolate produced according to the formulation of Example 3 was molten, and then subjected to tempering process to obtain chocolate mass. Then, 12 g of the chocolate mass was poured into mold and solidified at 5° C. for 30 minutes. Heat resistance and shape retention property of the chocolate was evaluated by pressing spatula to the chocolate under the atmosphere of 30° C. after storage at 20° C. for 7 days. When chocolate was not adhered to spatula, it is rated as good. When chocolate was adhered to spatula, it is rated as defective. The result was shown in table 4.

Evaluation of Meltability in the Mouth of the Chocolate

Evaluation of meltability in the mouth of the chocolate was carried out with sensory evaluation by 5 panelists. In the evaluation, chocolate which has appropriate hardness in biting and which melts rapidly in the mouth, i.e. chocolate having typical chocolate texture, was rated as good. The result was shown in table 4.

TABLE 4

Solidification speed of oil-and-fat, and demolding ratio, crystal stabilization speed, heat resistance and shape retention property and meltability in the mouth of chocolate

| | Solidification speed of oil-and-fat (solid fat content [%]) | Demolding ratio of chocolate | Crystal stabilization speed of chocolate [day] | Heat resistance and shape retention property | Meltability in the mouth of chocolate |
|---|---|---|---|---|---|
| Example 1 | 65.3 | 100.0 | 1 | Good | Very good |
| Example 2 | 61.2 | 100.0 | 1 | Good | Very good |
| Example 3 | 55.0 | 95.0 | 2 | Good | Very good |
| Comparative Example 1 | 29.1 | 75.0 | 6 | Good | Very good |
| Example 4 | 58.9 | 95.0 | 1 | Good | Very good |
| Example 5 | 51.3 | 90.0 | 2 | Good | Very good |
| Example 6 | 43.4 | 90.0 | 3 | Good | Good |
| Example 7 | 58.2 | 80.0 | 1 | Good | Very good |
| Example 8 | 75.1 | 100.0 | 1 | Good | Very good |
| Example 9 | 58.2 | 90.0 | 2 | Good | Very good |
| Comparative Example 2 | 47.5 | 75.0 | 2 | Bad | Very good |
| Example 10 | 63.4 | 100.0 | 1 | Good | Very good |
| Example 11 | 44.9 | 85.0 | 2 | Good | Very good |
| Comparative Example 3 | 30.4 | 65.0 | 5 | Good | Very good |
| Example 12 | 49.2 | 85.0 | 3 | Good | Very good |
| Comparative Example 4 | 40.1 | 75.0 | 5 | Good | Good |
| Example 13 | 48.3 | 85.0 | 3 | Good | Very good |
| Example 14 | 45.8 | 80.0 | 3 | Good | Very good |
| Comparative Example 5 | 81.2 | 100.0 | 1 | Good | Slightly bad, too hard feeling after bite |

As shown in the results of table 4, when the oil-and-fat compositions obtained in Examples 1 to 14 were used, solidification speed of the oil-and-fat was improved, and crystal stabilization speed and demolding property of the chocolate were also improved, and further, meltability in the mouth of the chocolate was also good.

INDUSTRIAL APPLICABILITY

When an oil-and-fat composition including specific amount or more of StOSt and POP triglycerides and specific amount or less of StLSt, PLP, StStO and PPO triglycerides is used, an oil-and-fat composition which can improve solidification property, demolding property and crystal stabilization speed and improve productivity and a chocolate including the oil-and-fat composition can be produced.

The invention claimed is:
1. An oil-and-fat composition, comprising 30 to 80 wt % of an oil-and-fat (A) and 20 to 70 wt % of an oil-and-fat (B), wherein
the oil-and-fat (A) comprises 70 wt % or more of StOSt and not more than 5 wt % of arachidic acid relative to a constituent fatty acid in the oil-and-fat (A), and
the oil-and-fat (B) comprises 60 wt % or more of POP, wherein:
the oil-and-fat composition comprises:
80 wt % or more of SOS triglyceride,
25 wt % or more of StOSt,
10 wt % or more of POP,
a ratio of StLSt/StOSt of 0.08 or less,
a ratio of StStO/StOSt of 0.03 or less, and
a ratio of PLP/POP of 0.10 or less, and wherein:
S is a saturated fatty acid having C16 to C22,
St is stearic acid,
P is palmitic acid,
L is linoleic acid,
O is oleic acid,
SOS is a triglyceride in which fatty acids at 1,3-positions are S and fatty acid at 2-position is O,
StOSt is a triglyceride in which fatty acids at 1,3-positions are St and fatty acid at 2-position is O,
StLSt is a triglyceride in which fatty acids at 1,3-positions are St and fatty acid at 2-position is L,
StStO is a triglyceride in which fatty acids at 1,2-positions or 2,3-positions are St and fatty acid at 3-position or 1-position is O,
PLP is a triglyceride in which fatty acids at 1,3-positions are P and fatty acid at 2-position is L, and
POP is a triglyceride in which fatty acids at 1,3-positions are P and fatty acid at 2-position is O.
2. The oil-and-fat composition according to claim 1, wherein the oil-and-fat composition comprises:
a ratio of PPO/POP of 0.10 or less, and wherein:
PPO is a triglyceride in which fatty acids at 1,2-positions or 2,3-positions are P and fatty acid at 3-position or 1-position is O.
3. A tempered chocolate comprising the oil-and-fat composition according to claim 1.
4. A tempering type cacao butter alternative, comprising the oil-and-fat composition according to claim 1.
5. A process for reducing aging time in a chocolate, comprising combining the oil-and-fat composition according to claim 1 with at least one ingredient to produce the chocolate.
6. The oil-and-fat composition according to claim 1, wherein the oil-and-fat composition comprises:
3 wt % or less of SSS, and wherein
SSS is a triglyceride in which fatty acids at 1,2,3-positions are S.
7. The oil-and-fat composition according to claim 1, wherein the oil-and-fat composition comprises 35 to 60 wt % of StOSt.
8. The oil-and-fat composition according to claim 7, wherein the oil-and-fat composition comprises:
a ratio of PPO/POP of 0.10 or less, and wherein:
PPO is a triglyceride in which fatty acids at 1,2-positions or 2,3-positions are P and fatty acid at 3-position or 1-position is O.
9. The oil-and-fat composition according to claim 8, wherein the oil-and-fat (A) comprises not more than 1.3 wt % of arachidic acid relative to a constituent fatty acid in the oil-and-fat (A).
10. A process for producing an oil-and-fat composition, comprising mixing 30 to 80 wt % of an oil-and-fat (A) and 20 to 70 wt % of an oil-and-fat (B), wherein
the oil-and-fat (A) comprises 70 wt % or more of StOSt and not more than 5 wt % of arachidic acid relative to a constituent fatty acid in the oil-and-fat (A), and
the oil-and-fat (B) comprises 60 wt % or more of POP, wherein:
the oil-and-fat composition comprises:
80 wt % or more of SOS triglyceride,
25 wt % or more of StOSt,
10 wt % or more of POP,
a ratio of StLSt/StOSt of 0.08 or less,
a ratio of StStO/StOSt of 0.03 or less, and
a ratio of PLP/POP of 0.10 or less, and wherein:
S is a saturated fatty acid having C16 to C22,
St is stearic acid,
P is palmitic acid,
L is linoleic acid,
O is oleic acid,
SOS is a triglyceride in which fatty acids at 1,3-positions are S and fatty acid at 2-position is O,
StOSt is a triglyceride in which fatty acids at 1,3-positions are St and fatty acid at 2-position is O,
StLSt is a triglyceride in which fatty acids at 1,3-positions are St and fatty acid at 2-position is L,
StStO is a triglyceride in which fatty acids at 1,2-positions or 2,3-positions are St and fatty acid at 3-position or 1-position is O,
PLP is a triglyceride in which fatty acids at 1,3-positions are P and fatty acid at 2-position is L, and
POP is a triglyceride in which fatty acids at 1,3-positions are P and fatty acid at 2-position is O.
11. The process according to claim 10, further comprising:
preparing the oil-and-fat (A) by a method comprising:
preparing an interesterified oil by subjecting high-oleic plant oil comprising 80 wt % or more of oleic acid relative to a constituent fatty acid in the high-oleic plant oil, and stearic acid or stearic acid alcohol ester to interesterification with 1,3-position-specific lipase, and
fractionating the interesterified oil by solvent fractionation or dry fractionation and recovering a high melting point fraction or a mid fraction as the oil-and-fat (A).
12. The process according to claim 10, further comprising:
preparing the oil-and-fat (B) by a method comprising:
fractionating a palm oil by solvent fractionation or dry fractionation and recovering a high melting point fraction or a mid fraction as the oil-and-fat (B).

13. The process according to claim 12, further comprising:
   preparing the oil-and-fat (B) by a method comprising:
   fractionating a palm oil by solvent fractionation or dry fractionation and recovering the high melting point fraction or the mid fraction as the oil-and-fat (B).

14. The process according to claim 13, wherein the oil-and-fat composition comprises 35 to 60 wt % of StOSt.

15. The process according to claim 14, wherein the oil-and-fat composition comprises:
   a ratio of PPO/POP in the oil-and-fat composition of 0.10 or less, and wherein:
   PPO is a triglyceride in which fatty acids at 1,2-positions or 2,3-positions are P and fatty acid at 3-position or 1-position is O.

16. The process according to claim 15, wherein the oil-and-fat (A) comprises not more than 1.3 wt % of arachidic acid relative to the constituent fatty acid in the oil-and-fat (A).

17. A process for reducing aging time in a chocolate, comprising combining the oil-and-fat composition obtained by the process according to claim 16 with at least one ingredient to produce the chocolate.

* * * * *